United States Patent [19]
Shioi et al.

[11] Patent Number: 4,525,520
[45] Date of Patent: Jun. 25, 1985

[54] METHOD OF PREPARING MICROCAPSULES

[75] Inventors: Shunsuke Shioi; Gensuke Matoba, both of Osaka; Makoto Miyake, Hyogo, all of Japan

[73] Assignee: Kanzaki Paper Manufacturing Company, Ltd., Japan

[21] Appl. No.: 592,553

[22] Filed: Mar. 23, 1984

[30] Foreign Application Priority Data

Mar. 28, 1983 [JP] Japan .................. 58-54779
Apr. 9, 1983 [JP] Japan .................. 58-62418
Jun. 14, 1983 [JP] Japan .................. 58-107423
Jan. 9, 1984 [JP] Japan .................. 58-3274

[51] Int. Cl.$^3$ ............................................. C08L 61/28
[52] U.S. Cl. .................................... 524/512; 346/200; 106/316; 252/49.5; 264/4; 428/402.21; 428/402.22; 428/402.24; 524/510; 524/597; 524/598; 528/254
[58] Field of Search ............. 524/512, 597, 598; 528/254; 106/316; 252/49.5; 264/4; 428/402.21, 402.22, 402.24; 525/163

[56] References Cited

U.S. PATENT DOCUMENTS 3,755,190 8/1973 Hart et al. ..................... 252/316
3,779,941 12/1973 Powell .......................... 252/316

FOREIGN PATENT DOCUMENTS 1198412 7/1970 United Kingdom .

Primary Examiner—Theodore E. Pertilla
Attorney, Agent, or Firm—Murray, Whisenhunt and Ferguson

[57] ABSTRACT

In a microencapsulation process which causes hydrophobic core material containing an oil-soluble melamine-formaldehyde precondensate to emulsified in water or in a hydrophilic medium, and to form capsule wall film under conditions for promoting polycondensation, the process which is characterized in that said oil-soluble melamine-formaldehyde precondensate is 40 to 100% in a degree of formaldehyde substitution, 80 to 100% in alkylation degree, and 4 to 11 in hydrophobic degree.

20 Claims, No Drawings

METHOD OF PREPARING MICROCAPSULES

This invention relates to a method of preparing microcapsules containing a hydrophobic core material, more particularly to a method of preparing very easily the microcapsules being provided with an excellent retainability of core material and having an extremely wide range for applications.

In recent years, the microencapsulation techniques have made a remarkable progress and the area for use of the microencapsulated products has been expanded greatly over a very wide field including the pressure sensitive manifold paper.

As for the manufacturing method of microcapsules, it is known that there are various methods such as the coacervation method, interfacial polymerization method, and in-situ polymerization method. In particular, various method have been proposed for manufacturing microcapsules having wall film of aldehyde polycondensation resin, because said resin has excellent water resistance and solvent resistance. For examples, U.S. Pat. No. 3,016,308, GB No. 1,198,412 and U.S. Pat. No. 3,755,190 have proposed as methods for depositing aldehyde polycondensates in water or other hydrophilic medium around hydrophobic core materials.

Though many encapsulation methods having been developed and proposed, these methods still have a great deal to be improved because some of the following drawbacks are accompanying:

1. These methods are susceptible to subtle change of the properties such as polymerization degree, molecular weight distribution, copolymerization ratio, and modification degree of the water soluble high molecular compound used as the emulsifier of the core material, and are apt to produce variations in quality such as wall film strength, in industrial-scale preparation when using different lot of materials.

2. A high-accuracy device is required for industrialization to control deviation of finished capsule which is apt to occur depending upon subtle different of capsule preparation condition.

3. The process is complex.

4. Stirring stronger than a given value is required to prevent coagulation of capsule particles when forming wall film. Thus, it is difficult to encapsulate while maintaining emulsified particle size, if the hydrophobic core material is readily sheared by low stirring.

5. If the emulsifier used is poor in the emulsifying ability, large oil drops are apt to form and cause spot smudges when the microcapsule is applied to pressure sensitive manifold paper.

6. Since the system tends to become high in viscosity during wall film formation and the depositing force of wall forming material on the surface of core material is weak, a quantity of diluting water must be used to promote deposition. This prevents the formation of high-concentration coating.

7. Depositing efficiency of wall forming material on the core material surface is poor and fails to provide sufficient retainability of the core material.

8. In case when the wall forming material deposited on the surface of core material is a mixture of aldehyde polycondensation resin having good water resistance and a polymer of poor water resistance, only capsules of poor water resistance can be obtained.

9. Even if the quantity of wall forming material used is increased to obtain capsules of thicker wall film having better core material retainability, the deposition efficiency of wall forming material on the surface of the core material gradually decreased proportionally to increased quantity of the wall forming material, and prevents the formation of thick wall film. In addition, the viscosity of the mixture is remarkably increased, which makes the capsule formation difficult unless the concentration is decreased.

Described more specifically, the methods which form urea-formaldehyde resin wall film or melamine-formaldehyde resin wall film in the presence of a copolymer of a hydrophobic monomer unit and maleic anhydride or polyacrylic acid in a hydrophilic medium as disclosed in Japanese Unexamined Patent Publication Nos. 9079/1976, 84881/1978, 53679/1979 and 85184/1979 as well as U.S. Pat. Nos. 4,087,376 and 4,089,802, and GB No. 2,006,709A entail such drawbacks (1), (2), (4) and (9) as mentioned above. Besides, such drawbacks as (1), (2), (4), (6), (8) and (9) are present in the methods which form urea-formaldehyde resin wall film in the presence of a carboxy-modified polyvinyl alcohol, gum arabic or polyvinyl alcohol of 95% or more in the saponification degree as set forth in U.S. Pat. No. 4,219,604, GB No. 2,017,037A and Japanese Unexamined Patent Publication No. 132631/1980, and the methods which form amino-aldehyde resin wall film in the presence of anion-modified polyvinyl alcohol or cation-modified polyvinyl alcohol as shown in U.S. Pat. Nos. 4,413,843 and 4,423,091.

On the other hand, a method which polymerizes oil-soluble aldehyde precondensates contained in hydrophobic core material to form capsule wall film has been proposed. The patents related to this method are seen in Japanese Examined Patent Publication Nos. 27257/1969 and 20885/1970, and U.S. Pat. No. 3,779,941, etc.

However, the above encapsulation methods developed so far have the following drawbacks.

For example, though capsules having thicker wall films can be obtained from higher concentration under low viscosity, the reaction velocity is low and crosslinking is difficult to form, resulting in poor core material retainability in spite of thick wall film. If a larger quantity of the oil-soluble aldehyde precondensate is blended to obtain capsules of better core material retainability, oligomers of the precondensate are formed being dissolved in the core material, even if the reaction is conducted under strict conditions. This results in increase of the viscosity of the core material. Such capsules will give very poor transferability if used as the capsules for pressure sensitive manifold paper.

It is an object of the present invention to provide a method of easy and steady manufacture of microcapsules having excellent retainability of capsule core material, for the manufacture of microcapsules having wall film of aldehyde polycondensation resin.

Another object of the invention is to provide a method of preparing capsules having excellent capsule core material retainability with ease and in higher concentration while controlling the thickness of the capsule wall film as required.

In a microencapsulation process which causes hydrophobic core material containing an oil-soluble melamine-formaldehyde precondensate to emulsified in water or in a hydrophilic medium, and to form capsule wall film under conditions for promoting polycondensation, the process of the invention is characterized in that said oil-soluble melamine-formaldehyde precondensate is 40 to 100% in a degree of formaldehyde substitution, 80 to 100% in alkylation degree, and 4 to 11 in hydrophobic degree.

It was found according to the invention that in the encapsulation process which deposits resin on the surface of fine particles of hydrophobic core material by polymerizing aldehyde resin precondensate contained in the hydrophobic core material, selection of the above described specific oil-soluble precondensate (hereinafter referred to as "melamine resin precondensate") permits the production of microcapsules of good core material retainability even under mild reaction conditions.

The melamine resin precondensate to be used in the invention is any one that dissolves completely or partly in the hydrophobic core material. Its degree of formaldehyde substitution, alkylation degree, and hydrophobic degree are adequately controlled in accordance with the HLB(hydrophilic-lipophilic balance) of the core material.

The degree of formaldehyde substitution used in the invention indicates what percentage of the active hydrogens possessed by the amino group of melamine has been substituted by methylol groups, alkoxymethylol groups, and methylene groups, represented by the following equation:

Degree of formaldehyde substitution = $[(A+B+2C) \times 100]/$[Number of melamines $\times 6$]

A: Number of methylol groups
B: Number of alkoxymethylol groups
C: Number of methylene groups The alkylation degree indicates what percentage of the methylol groups has been alkoxylated, represented by the equation:

Alkylation degree = $[B \times 100]/[A+B]$

In the invention are used preferably methylated, ethylated, methyl/ethylated, methyl/propylated, methyl/butylated, ethyl/propylated and ethyl/butylated melamine resin precondensates, and more preferably methylated, ethylated, methyl/ethylated, methyl/propylated and ethyl/propylated precondensates. In the above, for example, methyl/ethylated precondensate indicates a precondensate which has methylated portion and ethylated portion in the molecule.

The hydrophobic degree represents the total number of carbons in all alkyl groups of one melamine residue. In the invention are preferably used a melamine resin precondensate having a hydrophobic degree of 5 to 8 which gives particularly excellent capsules.

Among the above melamine resin precondensates are most preferably used those containing, as a main component, hexamethoxyhexamethylolmelamine or triethoxytrimethylolmelamine.

Although the melamine resin precondensates such as hexamethoxyhexamethylolmelamine are water-soluble, these melamine resin precondensates are simultaneously oil-soluble. The melamine resin precondensates of the invention include the above melamine resin precondensates which are both water- and oil-soluble.

In the invention, are favorably used precondensates having an average number of nuclei represented by the average number of melamine residues in one mole of precondensate of 1 to 10, more preferably 1 to 5.

In the invention, furthermore, other hydrophobic aldehyde resin precondensates can be used together with the melamine resin precondensates for the purpose of changing the performance of the wall film material. Such hydrophobic aldehyde resin precondensates are, for example, phenol-formaldehyde resin precondensates and amino-aldehyde resin precondensates. The phenol-formaldehyde resin precondensates include those obtained from the condensation of formaldehyde with at least one of the phenols such as phenol, cresol, xylenol, resorcinol, hydroquinone, pyrocatechol and pyrogallol. The amino-aldehyde resin precondensates include those obtained through the condensation of at least one of the amines such as urea, thiourea, alkylurea, ethyleneurea, acetoguanamine, benzoguanamine, melamine, guanidine, dicyandiamide, biuret and cyanamide with at least one of the aldehyde such as formaldehyde, acetaldehyde, paraformaldehyde, hexamethylenetetramine, glutaraldehyde, glyoxal and furfural, and their completely or partially alkylated products. Furthermore, among their anion, cation or nonion modified precondensates, hydrophobic ones can be used alone or jointly. For the etherification, alkyl groups having 1 to 8 carbon atoms are preferably used for easy preparation although not limited thereto. Examples of the anion modifiers are sulfamic acid, sulfanilic acid, glycollic acid, glycine, acid sulfites, phenol sulfonate and tourine. Examples of the cation modifiers are diethylenetriamine, triethylenetetramine, tetraethylenepentamine and dimethylaminoethanol. Examples of the nonion modifiers are ethylene glycol and diethylene glycol. These compounds are used to an extent that the precondensate will not lose hydrophobic nature.

When the melamine resin precondensate to be used in the invention has too high viscosity or insufficient solubility in the hydrophobic core material, or when the solution of the precondensate in the core material has too high viscosity, it is possible to use a polar solvent or low-boiling solvent. Low-boiling solvents usable for this purpose are, for example, n-pentane, methylene chloride, ethylene chloride, carbon disulfide, acetone, methyl acetate, chloroform, methyl alcohol, tetrahydrofuran, n-hexane, carbon tetrachloride, ethyl acetate, ethyl alcohol, n-propyl alcohol, isopropyl alcohol, n-butyl alcohol, isobutyl alcohol, tert.-butyl alcohol, n-pentyl alcohol, methyl ethyl ketone, benzene, toluene, xylene, ethyl ether and petroleum ether.

Usable polar solvents are, for example, dioxane, cyclohexanone, methyl isobutyl ketone and dimethylformamide.

The proportion of the melamine resin precondensate to be blended according to the invention is preferably 2 to 50 parts by weight, more preferably 4 to 30 parts by weight in terms of melamine based on 100 parts by weight of the hydrophobic core material, though cannot be determined depending on the kind of the precondensate, the kind and quantity of the hydrophobic core material and other hydrophobic aldehyde resin precondensates used conjointly, and the particle size and use of the capsule to be obtained.

If the hydrophobic core material is solid, the core material is preferably dispersed in the melamine resin precondensate or in a low-boiling solvent dissolved the melamine resin precondensate therein, and then the dispersion is added in water or in a hydrophilic medium to obtain an emulsion.

In the invention, the hydrophilic medium includes a liquid which is immiscible or hardly soluble with the hydrophobic core material. Examples of useful hydrophilic media are methanol, ethanol, 1-propanol, 2-propanol, ethylene glycol and like alcohols, and a mixture of water and at least one of these alcohols.

The polycondensation promoting condition in this invention cannot be generally determined, being varied depending upon the type of melamine resin precondensate and the use of the capsule, but is preferably 40° to 100° C. and a pH of 1 to 5.5, more preferably 60° to 100° C. and a pH of 1 to 5.0, most preferably 70° to 100° C. and a pH of 1 to 4.5. The polycondensation reaction is carried out in usually at least one hour, preferably at least 2 hours and more preferably at least 3 hours. When the capsule is used for pressure sensitive manifold paper, in particular, it is preferable to keep it at 80° to 100° C. and at a pH of 1 to 4.5 for 2 hrs or more.

In a preferable embodiment of the present invention, wherein one or more compounds selected from the group consisting of aldehydes, amines and phenols are contained in the water or in the hydrophilic medium, microcapsules having superior capsule core material retainability can be obtained.

The aldehydes to be used for this purpose are, for example, aldehydes used for the forming the hydrophobic amino-aldehyde resin precondensates. They can be used singly or jointly. Above all, formaldehyde, paraformaldehyde, hexamethylenetetramine, furfural, gultaraldehyde and glyoxal are preferable since they give good wall film.

The amines and phenols to be used are primary or secondary monovalent or polyvalent amines, and phenols which have at least two ortho and/or para positions to hydroxyl group that are free of substituent groups. Among them, preferable are amines and phenols used for preparing hydrophobic aldehyde resin precondensates. Above all, urea and resorcinol are most preferably, since they provide particularly good wall film.

These aldehydes, amines and phenols can be used either singly or jointly. The amounts of aldehydes, amines and phenols to be added to the water or hydrophilic medium are preferably in a range from 0.1 to 20 moles, more preferably from 1 to 10 moles, based on one mole of melamine residue in the melamine resin precondensation, though cannot be particularly limited, depending on the type and degree of condensation of the precondensates, etc.

These aldehydes, amines or phenols may be added at any time before the completion of the reaction, but the most effective is the addition immediately after the emulsification.

According to another preferable embodiment of the invention, wherein hydrophilic aldehyde resin forming materials are contained in the water or hydrophilic medium, microcapsules having excellent core material retainability can be prepared readily in high concentrations while controlling the thickness of capsule wall film as required.

The hydrophilic aldehyde resin forming materials are, for example, a combination of at least one compound selected from amines and phenols and at least one compound selected from aldehydes. They are selected adequately and added in the form of monomer or precondensate.

These amines, phenols and aldehydes are specifically those described above as the material for forming the hydrophobic aldehyde resin precondensates. The precondensates include those obtained by reacting at least one compound selected from the amines and phenols with at least one compound selected from the aldehydes, their alkylates, partial alkylates, their anion, cation or nonion modified precondensates of hydrophilic nature. As the anion, cation and nonion modifiers used for such modifications, the same modifiers are usable as described in the description of hydrophobic aldehyde resin precondensates.

Among the hydrophilic aldehyde resin forming materials as described above, preferably used are urea and formaldehyde which are the materials for urea-formaldehyde resin; urea-formaldehyde precondensates; melamine-formaldehyde precondensates and urea-melamine-formaldehyde precondensates. They are used singly or jointly.

Though it cannot be determined depending on the type of the hydrophobic core material to be used, the usage of the capsules, the type and quantity of the melamine resin precondensates, etc., the quantity of the hydrophilic aldehyde resin forming materials is preferably 0.5 to 40 parts by weight, more preferably 2 to 20 parts by weight in terms of the amine compound (when amine-aldehyde resin is used) or the phenol compound (when phenol-aldehyde resin is used) based on 100 parts by weight of the hydrophobic core material.

In the invention, if the hydrophobic core material containing the melamine resin precondensate can be emulsified in water or other hydrophilic medium, it may be unnecessary to particularly use an emulsifier. For easy emulsification, however, it is preferable to use an emulsifier, which may be anionic, nonionic, cationic or ampholytic high molecular or low molecular weight.

As the anionic emulsifier, either natural or synthetic polymer containing $-COO^-$, $-SO_3^-$ or $-OPO_3^{2-}$ group can be used.

They are, for example, natural polymers such as gum arabic, carrageenan, sodium alginate, pectic acid, trangacant gum, almond gum and agar; semi-synthetic polymers such as carboxymethyl cellulose, sulfated cellulose, sulfated methylcelluloe, carboxymethyl starch, phosphated starch and lignin sulfonic acid; and synthetic polymers such as maleic anhydride copolymers (including hydrolyzates thereof), acrylic acid, methacrylic acid or crotonic acid polymers and copolymers, vinylbenzenesulfonic acid or 2-acrylamido-2-methylpropanesulfonic acid polymers and copolymers, and partial amide or partial ester of such polymers and copolymers, carboxymodified polyvinyl alcohol, sulfonic acid-modified polyvinyl alcohol and phosphoric acid-modified polyvinyl alcohol.

Examples of the maleic anhydride copolymers (including hydrolyzates thereof) are methyl vinyl ether/maleic anhydride copolymer, ethylene/maleic anhydride copolymer, vinyl acetate/maleic anhydride copolymer, methacrylamide/maleic anhydride copolymer, isobutylene/maleic anhydride copolymer, styrene/maleic anhydride copolymer, etc.

Useful examples of acrylic acid, methacrylic acid and crotonic acid copolymers are methyl acrylate/acrylic acid copolymer (hereinafter the term "copolymer" is abbreviated), ethyl acrylate/acrylic acid, methyl acrylate/methacrylic acid, methyl methacrylate/acrylic acid, methyl methacrylate/methacrylic acid, methyl acrylate/acrylamide/acrylic acid, acrylonitrile/acrylic acid, acrylonitrile/methacrylic acid, hydroxyethyl acrylate/acrylic acid, hydroxyethyl methacrylate/methacrylic acid, vinyl acetate/acrylic acid, vinyl acetate/methacrylic acid, acrylamide/acrylic acid, acrylamide/methacrylic acid, methacrylamide/acrylic acid, methacrylamide/methacrylic acid, vinyl acetate/crotonic acid, etc.

Useful examples of vinylbenzene sulfonic acid or 2-acrylamido-2-methyl-propanesulfonic acid copolymers are methyl acrylate/vinylbenzene sulfonic acid copolymer (or salt thereof), vinyl acetate/vinylbenzene sulfonic acid copolymer, acrylamide/vinylbenzene sulfonic acid copolymer, acryloylmorpholine/vinylbenzene sulfonic acid copolymer, vinylpyrrolidone/vinylbenzene sulfonic acid copolymer, vinylpyrrolidone/2-acrylamide-2-methyl-propane sulfonic acid copolymer, etc.

The nonionic emulsifier is either natural or synthetic polymer, for example, of those having OH group(s).

Examples of nonionic semisynthetic polymers are hydroxyethyl cellulose, methyl cellulose, Pullulan (amorphous, readily water-soluble high molecular polysaccharide produced by microbial fermentation of starch), soluble starch and oxidized starch. The synthetic polymer is typified by polyvinyl alcohol.

Examples of cationic polymer used as the emulsifier in the invention are cation-modified polyvinyl alcohol, etc., and examples of ampholytic polymer are gelatine, etc.

The low molecular emulsifiers to be used in the invention can be anionic, cationic, nonionic and ampholytic, preferable anionic ones, and particularly preferable are Li, Na, K or $NH_4$ salt of organic sulfonic acid or organic phosphoric acid having total carbon atom in the range from 1 to 14.

Useful examples of the above salts of acids are sodium vinylsulfonate, sodium benzenesulfonate, sodium benzenesulfinate, sodium p-toluenesulfonate, sodium p-toluenesulfinate, sodium p-vinylbenzenesulfonate, sodium p-isoamylbenzenesulfonate, sodium naphthalene-α-sulfonate, sodium naphthalene-β-sulfonate, sodium 2-methylnaphthalene-6-sulfonate, sodium 2,6-dimethylnaphthalene-8-sulfonate, sodium 2,6-dimethylnaphthalene-3-sulfonate, sodium 1-naphthol-4-sulfonate, sodium benzene-m-disulfonate, Turkey red oil, sodium diphenylphosphate, sodium phenylphosphonate, sodium di-n-butylphosphate, sodium di-isoamyl phosphate, etc.

In the invention, the above high molecular and low molecular emulsifiers can be used either singly or jointly, in which preferable are the high molecular emulsifiers, particularly anionic polymers. Among them, maleic anhydride copolymers, acrylic acid, methacrylic acid, or crotonic acid polymers and copolymers which are free of hydroxyl group and amido group, are favorable since they hardly cause increase of viscosity which is apt to occur in the preparation under severe conditions and readily stabilize the emulsion particles. Above all, ethylene/maleic anhydride copolymer is most preferable.

The emulsifiers are preferably contained in water or in a hydrophilic medium in an amount of 0.1% or more, preferably 1% or more from the point of stability of the emulsion. The upper limit of the usage, which is determined depending on the viscosity of the system, the capsule preparing apparatus, etc., is generally 20%.

According to the invention, to keep the reaction system acidic, is used an acid catalyst such as formic acid, acetic acid, citric acid, oxalic acid, p-toluene-sulfonic acid, hydrochloric acid and sulfuric acid which are generally used in the aminoaldehyde resin manufacture.

Examples of the hydrophobic core material to be used as the inclusion of the capsules according to the invention are:

liquids insoluble or substantially insoluble in water typified by animal oils such as fish oil and lard oil; vegetable oils such as olive oil, peanut oil, linseed oil, soybean oil and castor oil; mineral oils such as petroleum, kerosine, xylene and toluene; synthetic oils such as alkylated diphenylalkane, alkylated naphthalene, biphenylethane, methyl salicylate, diethyl adipate, di-n-propyl adipate, di-n-butyl adipate, dimethyl phthalate, diethyl phthalate, di-n-propyl phthalate, di-n-butyl phthalate and di-n-octyl phthalate; or solutions of electron donating organic chromogenic materials, electron accepting reactant materials, ligand compounds, and organic metal salts dissolved in the above synthetic oils; water insoluble metal oxides and salts; fibrous materials such as cellulose and asbestos; water insoluble synthetic polymers; minerals; pigments; glasses; perfumes; spices; sterilizer composition; physiological composition; and fertilizer compositions.

The invention will be described in greater detail with reference to the following Examples applied to the field of pressure sensitive manifold paper. It should not be understood, however, that this will limit the present invention. Unless otherwise specified, "parts" and "%" used in the Examples and Comparison Examples are all by weight.

EXAMPLE 1

Preparation of trimethylolmelamine 37% Aqueous solution of formaldehyde (14.9 parts) was diluted with water to 100 parts and adjusted to pH 6.5 to 6.8 using 0.1N aqueous NaOH solution. Into this solution, 23.1 parts of melamine was added and completely dissolved by stirring with the temperature gradually raised to 75° C. After being held at 75° C. for 5 minutes, the solution was rapidly cooled to 0° C. and allowed to stand without stirring for 24 hours. This separates out white crystals.

The crystals were filtered out, washed with methanol several times, and air-dried, giving 25.7 parts of trimethylolmelamine crystals.

Preparation of triethoxytrimethylolmelamine

Into a separable flask equipped with a reflux condenser were placed 25.7 parts of trimethylolmelamine and 300 parts of ethanol. Thereto was added 5 parts of 1N hydrochloric acid while maintaining at 78° C. with stirring to dissolve the trimethylolmelamine crystals. Then, after holding at 78° C. for 30 minutes, 5 parts of 1N aqueous NaOH solution was added to the mixture.

The mixture was cooled, filtered to remove trace impurities and concentrated to 60 parts at 55° C. under reduced pressure. Then, with an addition of 30 parts of xylene, it was further concentrated under reduced pressure to 40 parts to obtain a xylene solution of triethoxytrimethylolmelamine. The above melamine was 50% in the degree of formaldehyde substitution, 100% in alkylation degree and 6 in hydrophobic degree.

Preparation of microcapsules

In a solvent mixture of 50 parts of diethyl adipate and 50 parts of di-n-butyl adipate were dissolved 20 parts of lauryl gallate and 5 parts of tribenzylamine. Into the mixture was admixed the above melamine resin precondensate to obtain an inner-phase solution (core material).

Separately, 200 parts of 3.0% aqueous solution of ethylene-maleic anhydride copolymer (trade name: EMA-31, a product of Monsanto Co., Ltd.) was placed into a vessel equipped with a stirrer and heater, and was adjusted to pH 5 with an aqueous 20% caustic soda solution to give an aqueous medium for preparing microcapsules. The above inner-phase solution was emulsified in the aqueous medium to obtain an emulsion containing particles 4.0μ in average size and the emulsion was heated to 70° C. and was maintained at the same temperature for 2 hours.

Then, 0.5N hydrochloric acid was slowly added to the system under stirring to adjust the pH to 3.5, and the mixture was slowly heated to 90° C. and was maintained at the same temperature for 5 hours to prepare a milk white capsule dispersion. To the capsule dispersion was added 20 parts of wheat starch powder and 10 parts of pulp powder. Water was added thereto in such amount as to achieve 25% solid concentration, whereby capsule-containing coating composition was obtained. The coating composition was applied by an air-knife coater to a paper substrate weighing 40 g/m² in an amount of 5 g/m² (as solids).

Preparation of self-contained type pressure sensitive manifold paper

To 800 parts of 5% aqueous solution of sodium hydroxide were added 89 parts of 4-tert.-butylbenzoic acid, 125 parts of diphenyl phosphate and 70 parts of sodium laurylbenzenesulfonate. An aqueous solution of 108 parts of ferric chloride in 500 parts of water was added to the solution with vigorous stirring to form a dispersion containing yellow fine particles. To the dispersion was added 500 parts of 20% aqueous solution of sodium 4-tert.-butylbenzoate. Thereto was added gradually 25 parts of titanium tetrachloride with vigorous stirring to obtain a light yellow fine particles dispersion which was filtered and washed with water to prepare a slurry.

In 200 parts of water were dissolved 1 part of sodium polyacrylate and 1 part of hydroxyethyl cellulose. Thereto were added 20 parts (as solids) of the slurry, 20 parts of titanium oxide and 60 parts of aluminum hydroxide with vigorous stirring to prepare a dispersion. To the dispersion was added 15 parts of carboxy-modified styrene-butadiene copolymer latex (50% concentration) to obtain a color acceptor coating composition.

The coating composition was applied by an air knife coater to the capsule-coated surface of the above paper in an amount of 5 g/m² by dry weight to prepare a self-contained type pressure sensitive manifold paper.

Evaluation

The above self-contained type pressure sensitive manifold paper gave sharp images by typewriting without ribbon. Separately, the above manifold paper was placed at 100° C. for 3 hours, but exhibited no smudge. This showed that the microcapsules had an excellent core material retainability.

EXAMPLE 2

Preparation of a melamine resin precondensate containing diethoxy-monoisopropoxytrimethylolmelamine as a main component Into a separable flask equipped with a reflux condenser were placed 25.7 parts of trimethylolmelamine, 11 parts of ethanol and 300 parts of isopropyl alcohol. Thereto was added 10 parts of 1N hydrochloric acid while maintaining at 78° C. with stirring to dissolve the trimethylolmelamine crystals. Then, after holding at 78° C. for 2 hours, 10 parts of 1N aqueous NaOH solution was added to the mixture.

The mixture was cooled, filtered to remove trace impurities and concentrated to 80 parts at 70° C. under reduced pressure. Then, with an addition of 30 parts of xylene, it was further concentrated under reduced pressure to 40 parts to obtain a xylene solution containing diethoxy-monoisopropoxytrimethylolmelamine as a main component. The malamine as the above main component was 50% in the degree of formaldehyde substitution, 100% in alkylation degree and 7 in hydrophobic degree.

Evaluation

Microcapsules and self-contained type pressure sensitive manifold paper were prepared in the same manner as in Example 1, except that the above melamine resin precondensate was used. The microcapsules exhibited an excellent core material retainability by the same evaluation as in Example 1.

EXAMPLE 3

Preparation of a melamine resin precondensate containing dimethoxy-monoisopropoxytrimethylolmelamine as a main component Into a separable flask equipped with a reflux condenser were placed 25.7 parts of trimethylolmelamine, 7.6 parts of methanol and 300 parts of isopropyl alcohol. Thereto was added 10 parts of 1N hydrochloric acid while maintaining at 64° C. with stirring to dissolve the trimethylolmelamine crystals. Then, after holding at 64° C. for 1 hour, 10 parts of 1N aqueous NaOH solution was added to the mixture.

The mixture was cooled, filtered to remove trace impurities and concentrated to 80 parts at 50° C. under reduced pressure. Then, with an addition of 30 parts of xylene, it was further concentrated under reduced pressure to 40 parts to obtain a xylene solution containing dimethoxy-monoisopropoxytrimethylolmelamine as a main component. The above melamine was 50% in the degree of formaldehyde substitution, 100% in alkylation degree and 5 in hydrophobic degree.

Evaluation

Microcapsules and self-contained type pressure sensitive manifold paper were prepared in the same manner as in Example 1, except that the above melamine resin precondensate was used. The microcapsules exhibited an excellent core material retainability by the same evaluation as in Example 1.

EXAMPLE 4

Preparation of a melamine resin precondensate containing monoethoxy-diisopropoxytrimethylolmelamine as a main component Into a separable flask equipped with a reflux condenser were placed 25.7 parts of trimethylolmelamine, 5.5 parts of ethanol and 300 parts of isopropyl alcohol. Thereto was added 10 parts of 1N hydrochloric acid while maintaining at 78° C. with stirring to dissolve the trimethylolmelamine crystals. Then, after holding at 78° C. for 2 hours, 10 parts of 1N aqueous NaOH solution was added to the mixture.

The mixture was cooled, filtered to remove trace impurities and concentrated to 80 parts at 70° C. under reduced pressure. Then, with an addition of 30 parts of xylene, it was further concentrated under reduced pressure to 40 parts to obtain a xylene solution containing monoethoxy-diisopropoxytrimethylolmelamine as a main component. The above melamine was 50% in the degree of formaldehyde substitution, 100% in alkylation degree and 8 in hydrophobic degree.

Evaluation

Microcapsules and self-contained type pressure sensitive manifold paper were prepared in the same manner as in Example 1, except that the above melamine resin precondensate was used. The microcapsules exhibited an excellent core material retainability by the same evaluation as in Example 1.

EXAMPLE 5

Preparation of a melamine resin precondensate containing monomethoxy-diethoxytrimethylolmelamine as a main component Into a separable flask equipped with a reflux condenser were placed 25.7 parts of trimethylolmelamine, 3.8 parts of methanol and 300 parts of ethanol. Thereto was added 5 parts of 1N hydrochloric acid while maintaining at 64° C. with stirring to dissolve the trimethylolmelamine crystals. Then, after holding at 64° C. for 30 minutes, 5 parts of 1N aqueous NaOH solution was added to the mixture.

The mixture was cooled, filtered to remove trace impurities and concentrated to 80 parts at 50° C. under reduced pressure. Then, with an addition of 30 parts of xylene, it was further concentrated under reduced pressure to 40 parts to obtain a xylene solution containing monomethoxy-diethoxytrimethylolmelamine as a main component. The above melamine was 50% in the degree of formaldehyde substitution, 100% in alkylation degree and 5 in hydrophobic degree.

Evaluation

Microcapsules and self-contained type pressure sensitive manifold paper were prepared in the same manner as in Example 1, except that the above melamine resin precondensate was used. The microcapsules exhibited an excellent core material retainability by the same evaluation as in Example 1.

EXAMPLE 6

Preparation of a melamine resin precondensate containing triisopropoxytrimethylolmelamine as a main component Into a separable flask equipped with a reflux condenser were placed 25.7 parts of trimethylolmelamine and 300 parts of isopropyl alcohol. Thereto was added 10 parts of 1N hydrochloric acid while maintaining at 78° C. with stirring to dissolve the trimethylolmelamine crystals. Then, after holding at 78° C. for 2 hours, 10 parts of 1N aqueous NaOH solution was added to the mixture.

The mixture was cooled, filtered to remove trace impurities and concentrated to 80 parts at 70° C. under reduced pressure. Then, with an addition of 30 parts of xylene, it was further concentrated under reduced pressure to 40 parts to obtain a xylene solution containing triisopropoxytrimethylolmelamine as a main component. The above melamine was 50% in the degree of formaldehyde substitution, 100% in alkylation degre and 9 in hydrophobic degree.

Evaluation

Microcapsules and self-contained type pressure sensitive manifold paper were prepared in the same manner as in Example 1, except that the above melamine resin precondensate was used. The microcapsules exhibited practically sufficient core material retainability, although slightly inferior to those of Example 1, by the same evaluation as in Example 1.

COMPARISON EXAMPLE 1

Microcapsules and self-contained type pressure sensitive manifold paper were prepared in the same manner as in Example 1, with exception of using 36 parts (as solids) of a melamine resin precondensate containing hexa-n-butoxyhexamethylolmelamine as a main component (trade name; Uvan 120, a product of Mitsu Toatsu Chemicals, Inc.). The above melamine was 100% in the degree of formaldehyde substitution, 100% in alkylation degree and 24 in hdrophobic degree.

The manifold paper was examined in the same manner as in Example 1 by treating at 100° C. for 3 hours, thereby showed smudge on the sheet. This revealed that the microcapsules were inferior in capsule core material retainability.

EXAMPLE 7

In a solvent mixture of 50 parts of diethyl adipate and 50 parts of di-n-butyl adipate was dissolved 20 parts of lauryl gellate. Into the mixture was admixed 19 parts (as solids) of melamine resin precondensate containing hexamethoxyhexamethylolmelamine as a main component (trade name; Nikalack MS-11, a product of Nippon Carbide Industries, Co., Ltd.) to obtain an inner-phase solution. The above melamine was 100% in the degree of formaldehyde substitution, 100% in alkylation degree and 6 in hydrophobic degree.

Separately, 200 parts of 3.0% aqueous solution of ethylene-maleic anhydride copolymer (trade name: EMA-31) was placed into a vessel equipped with a stirrer and heater, and was adjusted to pH 6.5 with an aqueous 20% caustic soda solution to give an aqueous medium for preparing microcapsules. The above inner-phase solution was emulsified in the aqueous medium to obtain an emulsion containing particles 5.0μ in average size and the emulsion was heated to 60° C.

Then, 0.5N hydrochloric acid was slowly added to the system under stirring to adjust the pH to 3.8, and the mixture was slowly heated to 80° C. and was maintained at the same temperature for 1 hour to prepare a milk white capsule dispersion. To the capsule dispersion was added 20 parts of wheat starch powder and 10 parts of pulp powder. Water was added thereto in such amount as to achieve 25% solid concentration, whereby capsule-containing coating composition was obtained. The coating composition was applied by an air-knife coater to a paper substrate weighing 40 g/m² in an amount of 5 g/m² (as solids) to obtain a top sheet.

Preparation of an under sheet

A color acceptor coating composition was prepared in the same manner as in Example 1 except that 40 parts of titanium oxide and 40 parts of calcium carbonate were used in place of 20 parts of titanium oxide and 60 parts of aluminum hydroxide.

The coating composition was applied by a rod-blade coater to a paper substrate weighing 40 g/m² in an amount of 5 g/m² (as solids) to obtain an under sheet.

Evaluation

The top sheet was superposed on the under sheet and sharp images were formed on the under sheet by typewriting. Separately, superposed top sheet and under sheet were placed at 100° C. for 2 hours, but the under sheet exhibited no smudge. This showed that the microcapsules had an excellent capsule core material retainability.

EXAMPLE 8

Microcapsules and top sheet were prepared in the same manner as in Example 7 except that 10 parts (as solids) of Nikalack MS-11 and 10 parts (as solids) of butylated urea resin precondensate (trade name: Uvan 10R, a product of Mitsui Toatsu Chemicals Inc.) were used in place of 19 parts (as solids) of Nikalack MS-11.

The microcapsules showed an excellent capsule core material retainability in the same evaluation as in Example 7.

EXAMPLE 8

Microcapsules and top sheet were prepared in the same manner as in Example 7 except that 10 parts (as solids) of Nikalack MS-11 and 10 parts (as solids) of Uvan 120 were used in place of 19 parts (as solids) of Nikalack MS-11.

The microcapsules showed an excellent capsule core material retainability in the same evalution as in Example 7.

COMPARISON EXAMPLE 2

A top sheet was obtained with use of capsules which were prepared in the same manner as in Example 7 with the exception of maintaining pH of the emulsion to 6.5 without adding 0.5N hydrochloric acid. An under sheet was prepared in the same manner as in Example 7.

The top sheet and under sheet were evaluated in the same manner as in Example 7. Although sharp images were formed, the under sheet showed considerable smudge with treatment at 100° C. for 2 hours. This showed that the microcapsules had a problem in capsule core material retainability.

COMPARISON EXAMPLE 3

To the emulsion maintained at 30° C. and obtained in the same manner as in Example 7 was gradually added 0.5N hydrochloric acid to adjust pH 3.8. The mixture was maintained at 30° C. further one hour to obtain a capsule dispersion.

A top sheet and under sheet were prepared and evaluated in the same manner as in Example 7 with the exception of using the above capsule dispersion. The result showed the same problem in capsule core material retainability similarly in Comparison Example 2.

EXAMPLE 10

A 4-parts quantity of crystal violet lactone was dissolved in 90 parts of alkylated naphthalene (trade name: KMC Oil, a product of Kureha Chemical Industry Co., Ltd.). The solution was added to a solution of 10 parts of diethyl adipate and 19 parts (as solids) of Nikalack MS-11 to obtain an inner-phase solution.

Microcapsules and top sheet were prepared in the same manner as in Example 7 with the exception of using the above inner-phase solution.

Preparation of an under sheet

A 65-parts quantity of aluminum hydroxide, 20 parts of zinc oxide, 15 parts of molten mixture (80/20) of zinc 3,5-di(α-methylbenzyl)salicylate and α-methylstyrene/styrene copolymer, 5 parts (as solids) of aqueous solution of polyvinyl alcohol and 300 parts of water were pulverized by a ball mill for 24 hours to obtain a dispersion. To the dispersion was added 20 parts (as solids) of carboxy-modified styrene/butadiene copolymer latex to prepare an color acceptor coating composition. The coating composition was applied by an airknife coater to a paper substrate weighing 40 g/m² in an amount of 5 g/m² (as solids) to obtain an under sheet.

Evaluation

The top sheet was superposed on the under sheet and sharp images were formed on the under sheet by typewriting. Separately, superposed top sheet and under sheet were placed at 100° C. for 2 hours, but the under sheet exhibited no smudge, showing an excellent capsule core material retainability of the microcapsules.

COMPARISON EXAMPLE 4

A top sheet was obtained with use of capsules which were prepared in the same manner as in Example 10 with the exception of maintaining pH of the emulsion to 6.5 without adding 0.5N hydrochloric acid. An under sheet was prepared in the same manner as in Example 10.

The top sheet and under sheet were evaluated in the same manner as in Example 10. The under sheet showed considerable smudge with treatment at 100° C. for 2 hours. This revealed that the microcapsules had a problem in capsule core material retainability.

EXAMPLES 11 AND 12

Two kinds of top sheet were prepared with use of capsules obtained in the same manner as in Example 7 with the exception of using 200 parts of 3.0% aqueous solution of each of polyacrylic acid (trade name; Aron A-10H, a product of Toagosei Chemical Industry Co., Ltd.) or methyl vinyl ether/maleic anhydride copolymer (trade name; Gantrez AN-139, a product of General Aniline & Film Co., Ltd.) in place of 200 parts of 3.0% aqueous solution of EMA-31. Under sheets were prepared in the same manner as in Example 7.

The top sheet and under sheet were evaluated in the same manner as in Example 7. The results showed an excellent capsule core material retainability in both Examples.

EXAMPLE 13

The emulsion obtained in the same manner as in Example 7 was heated to 60° C. Thereto was added 30 parts of 37% aqueous solution of formaldehyde. To the mixture was gradually added 0.5N hydrochloric acid to adjust pH 5.5. The mixture was gradually heated to 80° C. and reacted at 80° C. for one hour to obtain a capsule dispersion.

A top sheet and under sheet were prepared and evaluated in the same manner as in Example 7 with the exception of using the above capsule dispersion. The result showed an excellent capsule core material retainability.

EXAMPLE 14

A capsule dispersion was prepared in the same manner as in Example 13 except that 20 parts of 50% aqueous solution of glutaraldehyde was used in place of 30 parts of 37% aqueous solution of formaldehyde.

A top sheet and under sheet were prepared and evaluated in the same manner as in Example 7 with the exception of using the above capsule dispersion. The result showed an excellent capsule core material retainability.

EXAMPLE 15

A capsule coating composition was prepared in the same manner as in Example 7 except that the amount of Nikalack MS-11 was increased from 19 parts to 38 parts and the reaction at 80° C. was conducted for 5 hours. The above capsule coating composition was admixed with the color acceptor coating composition of Example 7 in equivalent amounts (as solids). The mixed coating composition was applied by an air-knife coater to a paper substrate weighing 40 g/m$^2$ in an amount of 8 g/m$^2$ (as solids) to obtain a self-contained type pressure sensitive manifold paper.

Sharp images were formed on the above manifold paper by typewriting without ribbon. Separately, the manifold paper was placed at 100° C. for 2 hours, but exhibited no coloring. This showed that the microcapsules had an excellent capsule core material retainability.

EXAMPLE 16

A capsule coating composition was prepared in the same manner as in Example 10 except that the amount of Nikalack MS-11 was increased from 19 parts to 38 parts and the reaction at 80° C. was conducted for 5 hours. The above capsule coating composition was admixed with the color acceptor coating composition of Example 10 in equivalent amounts (as solids). The mixed coating composition was applied by an air-knife coater to a paper substrate weighing 40 g/m$^2$ in an amount of 8 g/m$^2$ (as solids) to obtain a self-contained type pressure sensitive manifold paper.

Sharp images were formed on the above manifold paper by typewriting without ribbon. Separately, the manifold paper was placed at 100° C. for 2 hours, but exhibited no coloring. This showed that the microcapsules had an excellent capsule core material retainability.

EXAMPLE 17

An emulsion containing particles 5.0$\mu$ was prepared in the same manner as in Example 7 except that the amount of Nikalack MS-11 was increased from 19 parts to 27 parts and pH of the aqueous medium for preparing microcapsules was changed from 6.5 to 5.5. The emulsion was heated to 60° C. and 15 parts of urea was added with stirring. Then, 0.5N hydrochloric acid was slowly added to the system to adjust the pH to 3.8, and the mixture was slowly heated to 80° C. and was maintained at the same temperature for 5 hours to prepare a milk white capsule dispersion.

A top sheet was prepared in the same manner as in Example 7 with the exception of using the above capsule dispersion. An under sheet was also prepared in the same manner as in Example 7.

Evaluation

The top sheet was superposed on the under sheet and sharp images were formed on the under sheet by typewriting. Separately, the top sheet treatment at 50° C. and 90% RH for 12 hours was superposed on the under sheet. In this case, sharp images were also formed on the under sheet similarly when using the untreated top sheet, showing that the microcapsules had an excellent capsule core material retainability.

EXAMPLES 18 AND 19

Two kinds of top sheet were prepared with use of capsules obtained in the same manner as in Example 17 with the exception of using 10 parts of resorcinol or a mixture of 20 parts of urea and 2 parts of resorcinol in place of 15 parts of urea. Under sheets were prepared in the same manner as in Example 17.

The both top sheets were evaluated in the same manner as in Example 17. The results showed an excellent capsule core material retainability in both Examples.

EXAMPLE 20

An emulsion containing particles 4.0$\mu$ was prepared in the same manner as in Example 7 except that the amount of Nikalack MS-11 was increased from 19 parts to 36 parts and pH of the aqueous medium for preparing microcapsules was changed from 6.5 to 4.5. The emulsion was heated to 60° C. and then 0.5N hydrochloric acid was slowly added with stirring to the system to adjust the pH to 3.5, and the mixture was slowly heated to 80° C. and was maintained at the same temperature for 5 hours to prepare a milk white capsule dispersion.

A 20-part quantity of wheat starch powder and 10 parts of pulp powder were added to the dispersion. Water was added thereto in such amount as to achieve 25% solids concentration, whereby a capsule-containing coating composition was obtained. The coating composition was applied by an air-knife coater to a paper substrate weighing 40 g/m$^2$ in an amount of 5 g/m$^2$ (as solids).

Preparation of self-contained type pressure sensitive manifold paper

A color acceptor coating composition was prepared in the same manner as in Example 7 except that 20 parts of titanium oxide and 60 parts of calcium carbonate were used in place of 40 parts of titanium oxide and 40 parts of calcium carbonate. The color acceptor coating composition was applied by an air-knife coater to the above capsule-coated surface in an amount of 5 g/m$^2$ (as solids) to obtain self-contained type pressure sensitive manifold paper.

Evaluation

Sharp images were formed on the above manifold paper by typewriting without ribbon. Separately, the manifold paper was placed at 100° C. for 3 hours, but exhibited no smudge, showing an excellent capsule core material retainability of the microcapsules.

EXAMPLES 21 AND 22

Two self-contained type pressure sensitive manifold papers were prepared with use of capsules obtained in the same manner as in Example 20 except that each 36 parts (as solids) of Cymel 300 or Cymel 301 which were melamine resin precondensate containing hexamethoxyhexamethylolmelamine as a main component (both are products of Mitui Toatsu Chemicals Inc.) was used in place of Nikalack MS-11. Each of the above melamines was 100% in the degree of formaldehyde substitution, 100% in alkylation degree and 6 in hydrophobic degree.

The manifold papers were evaluated in the same manner as in Example 20 and showed an excellent capsule core material retainability.

EXAMPLE 23

A 320 g-quantity of 37% aqueous solution of formaldehyde, 8 cc of 1N aqueous solution of NaOH and 20 g of melamine were mixed at 30° to 35° C. for 20 minutes with stirring to dissolve the melamine. The mixture was placed at room temperature for one day to precipitate hexamethylolmelamine crystals.

The crystals were filtered out with suction, washed with methanol several times until the filtrate changed BTB (Bromothymol Blue) indicator to yellow-green. To the crystals was added methanol in such amount the total weight became 400 g. The mixture was heated to boiling point with stirring and thereto was added 1 cc of 0.5N aqueous solution of HCl and reacted for about 15 minutes to dissolve the crystals. Thereto was added 0.5N aqueous solution of NaOH until BTB indicator became green.

The mixture was cooled, filtered to remove trace impurities and concentrated to about 68 g at below 50° C. under reduced pressure. The concentrate solidified when allowed to place at room temperature. Recrystallization of the mixture with methanol several times gave hexamethoxyhexamethylolmelamine precondensate which was 100% in the degree of formaldehyde substitution, 100% in alkylation degree and 6 in hydrophobic degree.

A self-contained type pressure sensitive manifold paper was prepared with use of capsules obtained in the same manner as in Example 20 except that 36 parts (as solids) of the above hexamethoxyhexamethylolmelamine precondensate was used in place of Nikalack MS-11.

The manifold paper was evaluated in the same manner as in Example 20 and showed an excellent capsule core material retainability.

COMPARISION EXAMPLE 5

A self-contained type pressure sensitive manifold paper was prepared with use of capsules obtained in the same manner as in Example 20 except that 36 parts (as solids) of Uvan 120 was used in place of Nikalack MS-11.

The manifold paper was evaluated in the same manner as in Example 20 by treating at 100° C. for 3 hours, thereby showed smudge on the sheet and revealed inferior in capsule core material retainability.

COMPARISON EXAMPLE 6

A self-contained type pressure sensitive manifold paper was prepared with use of capsules obtained in the same manner as in Example 20 except that 36 parts (as solids) of melamine resin precondensate containing hexaisobutoxyhexamethylolmelamine as a main component (Uvan 165, a product of Mitsui Toatsu Chemicals Inc.) was used in place of Nikalack MS-11.

The manifold paper was evaluated in the same manner as in Example 20, thereby revealed inferior in capsule core material retainability.

We claim:

1. In a microencapsulation process which causes hydrophobic core material containing an oil-soluble melamine-formaldehyde precondensate to be emulsified in water or in a hydrophilic medium, and to form capsule wall film under conditions for promoting polycondensation, the process which is characterized in that said oil-soluble melamine-formaldehyde precondensate is 40 to 100% in a degree of formaldehyde substitution, 80 to 100% in alkylation degree, and 4 to 11 in hydrophobic degree.

2. A process as defined in claim 1 wherein the oil-soluble melamine-formaldehyde precondensate is methylated, ethylated, methyl/ethylated, methyl/propylated, methyl/butylated, ethyl/propylated or ethyl/butylated melamine-formaldehyde precondensate.

3. A process as defined in claim 2 wherein the oil-soluble melamine-formaldehyde precondensate is methylated, ethylated, methyl/ethylated, methyl/propylated or ethyl/propylated melamine-formaldehyde precondensate.

4. A process as defined in claim 1 wherein the oil-soluble melamine-formaldehyde precondensate has a hydrophobic degree of 5 to 8.

5. A process as defined in claim 1 wherein the oil-soluble melamine-formaldehyde precondensate contains hexamethoxyhexamethylolmelamine as a main component.

6. A process as defined in claim 1 wherein the oil-soluble melamine-formaldehyde precondensate contains triethoxytrimethylolmelamine as a main component.

7. A process as defined in claim 1 wherein the oil-soluble melamine-formaldehyde precondensate is used in an amount of 2 to 50 parts by weight in terms of melamine based on 100 parts by weight of the hydrophobic core material.

8. A process as defined in claim 7 wherein the oil-soluble melamine-formaldehyde precondensate is used in an amount of 4 to 30 parts by weight in terms of melamine based on 100 parts by weight of the hydrophobic core material.

9. A process as defined in claim 1 wherein the precondensation reaction is conducted at least 40° C. and at a pH below 5.5.

10. A process as defined in claim 9 wherein the precondensation reaction is conducted at least 60° C. and at a pH below 5.0.

11. A process as defined in claim 10 wherein the precondensation reaction is conducted at least 70° C. and at a pH below 4.5.

12. A process as defined in claim 1 wherein at least one compound selected from the group consisting of aldehydes, amines and phenols is contained in the water or in the hydrophilic medium.

13. A process as defined in claim 12 wherein the aldehyde is at least one compound selected from the group consisting of formaldehyde, paraformaldehyde, hexamethylenetetramine, furfural, gultaraldehyde and glyoxal.

14. A process as defined in claim 12 wherein the amine is primary or secondary monovalent or polyvalent amine.

15. A process as defined in claim 12 wherein the phenol has at least two ortho and/or para positions to hydroxyl group that are free of substitutent groups.

16. A process as defined in claim 12 wherein the aldehyde, amine or phenol is used in an amount of 0.1 to 20 moles based on one mole of melamine residue in the precondensates.

17. A process as defined in claim 16 wherein the aldehyde, amine or phenol is used in an amount of 1 to 10 moles based on one mole of melamine residue in the precondensates.

18. A process as defined in claim 1 wherein an anionic high molecular compound is contained in the water or in the hydrophilic medium as an emulsifier.

19. A process as defined in claim 18 wherein the anionic high molecular compound is at least one compound selected from the group consisting of maleic anhydride copolymers, acrylic acid, methacrylic acid and crotonic acid homopolymers and copolymers.

20. A process as defined in claim 18 wherein the emulsifier is added to the water or the hydrophilic medium in an amount of at least 0.1% by weight.

* * * * *